(12) United States Patent
Fukumoto et al.

(10) Patent No.: US 12,459,853 B2
(45) Date of Patent: Nov. 4, 2025

(54) MULTI-CORE OPTICAL FIBER PREFORM, MULTI-CORE OPTICAL FIBER PREFORM PRODUCTION METHOD, AND MULTI-CORE OPTICAL FIBER PRODUCTION METHOD

(71) Applicant: Fujikura Ltd., Tokyo (JP)

(72) Inventors: Ryohei Fukumoto, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 97 days.

(21) Appl. No.: 18/246,919

(22) PCT Filed: Feb. 18, 2022

(86) PCT No.: PCT/JP2022/006756
§ 371 (c)(1),
(2) Date: Mar. 28, 2023

(87) PCT Pub. No.: WO2022/176990
PCT Pub. Date: Aug. 25, 2022

(65) Prior Publication Data
US 2023/0382779 A1    Nov. 30, 2023

(30) Foreign Application Priority Data

Feb. 22, 2021   (JP) .................................. 2021-026466

(51) Int. Cl.
*C03B 37/012*   (2006.01)
*C03B 37/027*   (2006.01)

(52) U.S. Cl.
CPC .. *C03B 37/01222* (2013.01); *C03B 37/01251* (2013.01); *C03B 37/027* (2013.01); *C03B 2203/34* (2013.01)

(58) Field of Classification Search
None
See application file for complete search history.

(56) References Cited

U.S. PATENT DOCUMENTS

2005/0271339 A1* 12/2005 Rajala ............... C03B 37/02736
385/123
2013/0061637 A1*  3/2013 Okada ............... C03B 37/01251
65/435

(Continued)

FOREIGN PATENT DOCUMENTS

JP   H09-126946 A   5/1997
JP   2012-137615 A   7/2012

(Continued)

OTHER PUBLICATIONS

JP2016-175779 EPO Machine Translation retrieved Apr. 14, 2025. (Year: 2025).*

(Continued)

*Primary Examiner* — Lisa L Herring
(74) *Attorney, Agent, or Firm* — Osha Bergman Watanabe & Burton LLP

(57) ABSTRACT

A multi-core optical fiber preform includes: a rod-shaped main cladding body having one or more main inner holes; main core rods inserted into the one or more main inner holes; and a tip continuously-installed portion disposed at one end of the rod-shaped main cladding body and including a glass rod having no core rod or having one core rod.

9 Claims, 8 Drawing Sheets

(56) References Cited

U.S. PATENT DOCUMENTS

2018/0244556 A1\* 8/2018 Nagashima ....... C03B 37/02736
2019/0300421 A1\* 10/2019 Nakanishi ......... C03B 37/01222

FOREIGN PATENT DOCUMENTS

| JP | 2016-175779 A | 10/2016 |
| --- | --- | --- |
| JP | 2019-31427 A | 2/2019 |
| JP | 2019-172480 A | 10/2019 |

OTHER PUBLICATIONS

International Search Report issued in corresponding International Application No. PCT/JP2022/006756 mailed Apr. 5, 2022 (2 pages).

\* cited by examiner

MULTI-CORE OPTICAL FIBER PREFORM, MULTI-CORE OPTICAL FIBER PREFORM PRODUCTION METHOD, AND MULTI-CORE OPTICAL FIBER PRODUCTION METHOD

BACKGROUND

Technical Field

The present invention relates to a multi-core optical fiber preform, a multi-core optical fiber preform production method, and a multi-core optical fiber production method.

Description of the Related Art

The thickness of a coating layer of an optical fiber affects the microbend characteristics, temperature characteristics, and the like of the optical fiber. For that reason, when an optical fiber is produced, there is a case where the deviation of the thickness of a coating layer (hereinafter referred to as asymmetry) is confirmed. The asymmetry in coating layers can be confirmed by forward scattered light obtained by irradiating a side surface of the optical fiber with laser light (refer to, for example, Patent Document 1). The positions of brightness and darkness in the forward scattered light are affected by the thickness distribution of the coating layer. For that reason, it is possible to confirm the asymmetry of the coating layer on the basis of the position of the brightness and darkness of the forward scattered light.

PATENT DOCUMENT

Patent Document 1: Japanese Unexamined Patent Application No. H09-126946

In recent years, with an increase in communication traffic, attention has been paid to multi-core optical fibers as optical fibers capable of increasing transmission capacity.

However, with the multi-core optical fibers, there is a case where it is difficult to accurately confirm the asymmetry of a coating layer.

SUMMARY

One or more embodiments may provide a multi-core optical fiber preform, a multi-core optical fiber preform production method, and a multi-core optical fiber production method, which can accurately confirm the asymmetry of a coating layer.

A multi-core optical fiber preform according to one or more embodiments includes a main cladding body (a rod-shaped main cladding body) that is a rod shape and is configured to have one or a plurality of main inner holes formed therein; a plurality of main core rods configured to be inserted into the main inner hole; and a tip continuously-installed portion configured to be continuously installed at one end of the main cladding body, and the tip continuously-installed portion is a glass rod having no core rod or having one core rod.

According to the multi-core optical fiber preform, the tip continuously-installed portion includes no core rod or has one core rod. The tip continuously-installed portion has a smaller number of cores than the glass material unit (a unit including the main cladding body and the main core rod). Since the tip continuously-installed portion allows a coated wire having one or less cores to be made, the asymmetry of a coating layer can be confirmed under the conditions of less light scattering. Hence, it is possible to accurately confirm the asymmetry of the coating layer.

The plurality of main core rods may include a first core rod and a second core rod, a dimension of the second core rod in an axial direction being shorter than a dimension of the main cladding body in an axial direction, and the first core rod may be disposed at a center of the main cladding body.

The tip continuously-installed portion may be a solid glass rod.

The tip continuously-installed portion may include a constant diameter portion having a constant outer diameter, and a reduced diameter portion that is reduced in diameter from a tip of the constant diameter portion and protrudes from the tip, and a length of the constant diameter portion in an axial direction is equal to or larger than a length of the reduced diameter portion in the axial direction.

The tip continuously-installed portion may include a constant diameter portion having a constant outer diameter, and a reduced diameter portion that is reduced in diameter from a tip of the constant diameter portion and protrudes from the tip, and a length of the constant diameter portion in an axial direction may be less than a length of the reduced diameter portion in the axial direction.

A multi-core optical fiber preform production method according to one or more embodiments includes a preparation step of preparing a glass material unit in which a plurality of main core rods is inserted into one or a plurality of main inner holes formed in a main cladding body that is a rod-shape; a glass rod connection step of butt-connecting a glass rod having no core rod or having one core rod to one end portion of the glass material unit; and a glass rod cutting step of leaving a portion of the glass rod as a tip continuously-installed portion continuously installed at the glass material unit and separating the remaining portion of the glass rod by fusing.

According to the above production method, since the tip continuously-installed portion having no core rod or one core rod is formed, the number of cores of a coated wire is small. Therefore, the asymmetry of a coating layer can be confirmed under the conditions of less light scattering. Hence, it is possible to accurately confirm the asymmetry of the coating layer.

The main core rods may include a first core rod and a second core rod, a dimension of the second core rod in an axial direction being shorter than a dimension of the main cladding body in an axial direction, in the preparation step, the glass material unit in which the first core rod is inserted into a center of the main cladding body and the second core rod is inserted around the first core rod such that a gap is provided between an end surface of the main cladding body and the second core rod may be prepared in the main inner hole, and after the preparation step, the gap may be blocked by heating the gap to reduce the diameter of the main cladding body.

The tip continuously-installed portion may be a solid glass rod.

The tip continuously-installed portion may be a single core unit including a tip cladding body that is a rod shape and has one tip inner hole formed therein and one tip core rod inserted into the tip inner hole.

In the glass rod cutting step, the tip continuously-installed portion may be formed to include a constant diameter portion having a constant outer diameter, and a reduced diameter portion that is reduced in diameter from a tip of the constant diameter portion and protrudes from the tip, and a length of the constant diameter portion in an axial direction may be equal to or larger than a length of the reduced diameter portion in the axial direction.

In the glass rod cutting step, the tip continuously-installed portion may be formed to include a constant diameter portion having a constant outer diameter, and a reduced diameter portion that is reduced in diameter from a tip of the constant diameter portion and protrudes from the tip, and a length of the constant diameter portion may be less than a length of the reduced diameter portion in the axial direction.

A multi-core optical fiber production method according to one or more embodiments forms a multi-core optical fiber by drawing a multi-core optical fiber preform obtained by the above multi-core optical fiber preform production method.

According to one or more embodiments, it is possible to provide the multi-core optical fiber preform, the multi-core optical fiber preform production method, and the multi-core optical fiber production method, which can accurately confirm the asymmetry of the coating layer.

DESCRIPTION OF THE EMBODIMENTS

Hereinafter, a multi-core optical fiber preform, a multi-core optical fiber preform production method, and a multi-core optical fiber production method according to embodiments will be described with reference to the drawings.

First Example

[Multi-Core Optical Fiber Preform]

Figure 1:
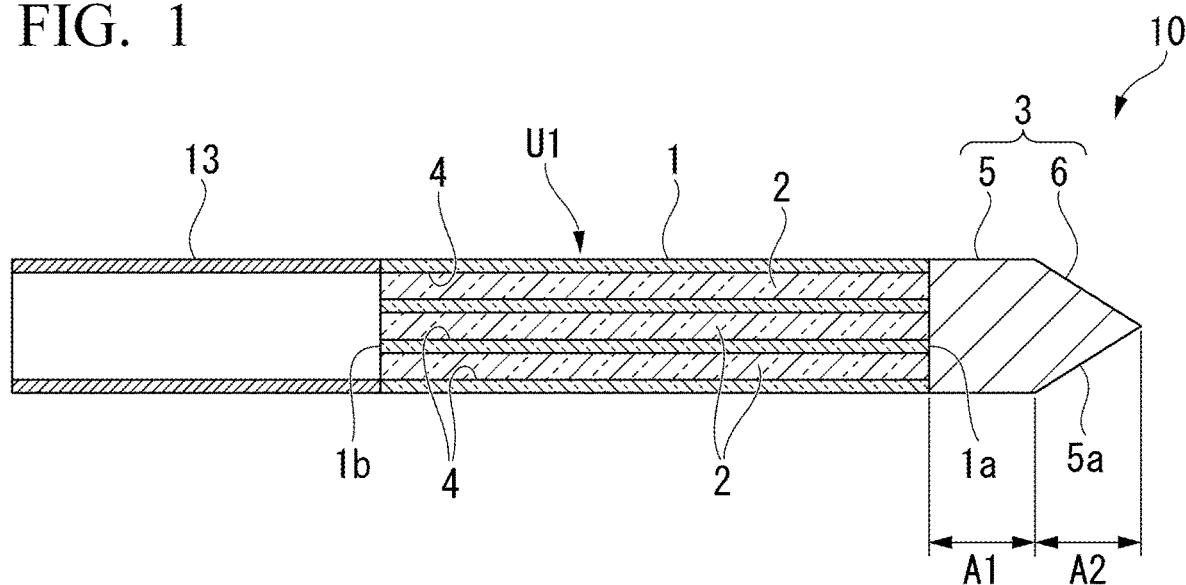
FIG. 1 is a sectional view in an axial direction of a multi-core optical fiber preform of one or more embodiments.

FIG. 1 is a sectional view in an axial direction of a multi-core optical fiber preform 10 (hereinafter simply referred to as an optical fiber preform 10) of one or more embodiments.

The optical fiber preform 10 includes a main cladding body (a rod-shaped main cladding body) 1, a plurality of main core rods 2, a tip continuously-installed portion 3, and a dummy tube 13.

The main cladding body 1 is formed in a columnar shape (rod shape). The main cladding body 1 is made of glass. The main cladding body 1 is, for example, an integrally molded product made of silica glass. A plurality of main inner holes 4 is formed in the main cladding body 1. Each main inner hole 4 is formed in the axial direction of the main cladding body 1. A first end 1a is one end of the main cladding body 1 on a side where the tip continuously-installed portion 3 is provided. A second end 1b is an end surface of the main cladding body 1 opposite to the first end 1a. Here, as shapes that can be taken by the first end 1a and the second end 1b, an end surface shape and a non-end surface shape are exemplary examples.

The main core rod 2 is formed in a columnar shape (rod shape). The main core rod 2 includes a region with a higher refractive index compared to the main cladding body 1. The main core rod 2 may be made of glass (for example, silica glass) to which a refractive index-increasing dopant (germanium, phosphorus, aluminum, titanium, or the like) is partially added, or glass (for example, silica glass) to which a refractive index-decreasing dopant (boron, fluorine, or the like) is added. The main core rod 2 is inserted into the main inner hole 4. The main cladding body 1 and the plurality of main core rods 2 constitute a "glass material unit U1".

The tip continuously-installed portion 3 is made of glass (for example, silica glass). The tip continuously-installed portion 3 is continuously installed at the first end 1a (one end) of the main cladding body 1 by welding. The tip continuously-installed portion 3 is coaxial with the main cladding body 1. The tip continuously-installed portion 3 blocks the openings of all the main inner holes 4 of the main cladding body 1. The outer diameter of the tip continuously-installed portion 3 is preferably the same as the outer diameter of the main cladding body 1.

The tip continuously-installed portion 3 is, for example, a solid glass rod. Since the tip continuously-installed portion 3 is solid, the tip continuously-installed portion 3 does not include any core rod (that is, the number of core rods owned is zero). The refractive index of the tip continuously-installed portion 3 may be substantially the same as the refractive index of the main cladding body 1.

In addition, as will be described below, the number of core rods owned in the tip continuously-installed portion may be one. That is, the number of core rods owned in the tip continuously-installed portion is one, or the tip continuously-installed portion does not have a core rod.

The tip continuously-installed portion 3 includes a constant diameter portion 5 and a reduced diameter portion 6. The constant diameter portion 5 is a portion including an end portion continuously installed at the first end 1a of the main cladding body 1. The constant diameter portion 5 is formed in a columnar shape (rod shape). The outer diameter of the constant diameter portion 5 is constant. The reduced diameter portion 6 is reduced in diameter from a tip 5a of the constant diameter portion 5 and protrudes from the tip 5a. The reduced diameter portion 6 is formed in a tapered shape (for example, conical shape).

The length of the constant diameter portion 5 in the axial direction is defined as A1. The length of the reduced diameter portion 6 in the axial direction is defined as A2. The length A1 of the constant diameter portion 5 may be equal to or larger than the length A2 of the reduced diameter portion 6. The length A1 of the constant diameter portion 5 may be less than the length A2 of the reduced diameter portion 6.

The dummy tube 13 is continuously installed at the second end 1b of the glass material unit U1. In addition, the optical fiber preform 10 may be configured without the dummy tube 13.

[Multi-Core Optical Fiber Preform Production Method]

A method of producing the optical fiber preform 10 will now be described with reference to FIGS. 2 to 8. In addition, in the drawings used for the following description, there is a case where the scale is changed in order to make the members recognizable in size.

The optical fiber preform production method shown herein has (1) a drilling step, (2) a cleaning step, (3) a preparation step, (4) a dummy tube connection step, (5) a sealing step, and (6) a glass rod connection step, and (7) a glass rod cutting step. The respective processes will be described below.

(1) Drilling Step

Figure 2:
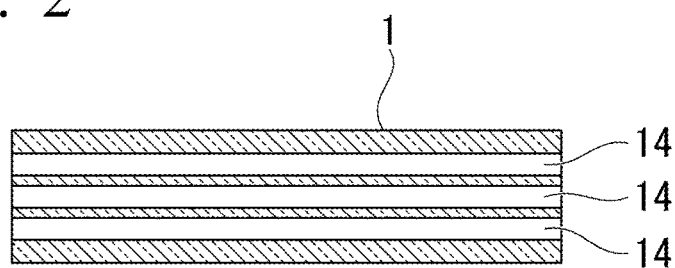
FIG. 2 is a process diagram showing a multi-core optical fiber preform production method of one or more embodiments.

As shown in FIG. 2, a plurality of through-holes 14 is formed in the main cladding body 1 using a drill tool or the like. Each through-hole 14 is formed in the main cladding body 1 along the axial direction. Both ends of the through-hole 14 are open to end surfaces of the main cladding body 1 in the axial direction. The through-holes 14 are, for example, formed at a plurality of spots at intervals in a direction around an axis so as to surround a center axis of the main cladding body 1.

(2) Cleaning Step

In the through-hole 14, since there is a case where a cutting fluid used for drilling, metal powder derived from the drill tool, or the like may remain, an outer surface of the main cladding body 1 and an inner surface of the through-hole 14 are cleaned using a cleaning solution such as pure water, alcohol (ethanol), or an alkaline solution.

In the cleaning step, the inner surface of the through-hole 14 can also be processed by etching. For example, foreign matter (such as the metal powder) adhering to microcracks on the inner surface of the through-hole 14 can be removed by the etching. The etching may be wet etching or dry etching. In the wet etching, an etching solution containing hydrofluoric acid, such as buffered hydrofluoric acid (BHF), which is a mixture of hydrofluoric acid and ammonium fluoride, can be used. In the dry etching, a fluorinated gas such as sulfur hexafluoride ($SF_6$) gas or hexafluoroethane ($C_2F_6$) gas can be used as an etching gas. In the dry etching, for example, an etching gas is introduced into the through-holes 14 while heating the main cladding body 1 to 1200° C. or higher.

(3) Preparation Step

Figure 3:
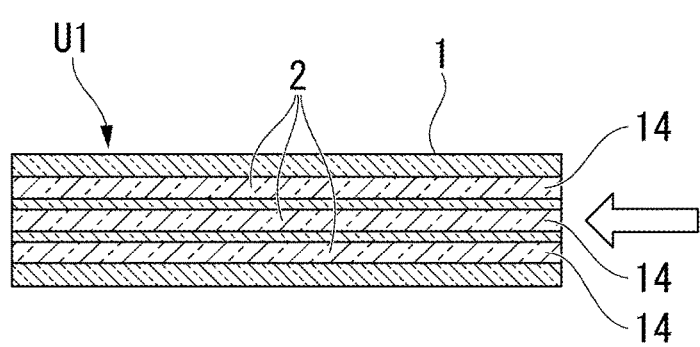
FIG. 3 is a process diagram subsequent to FIG. 2.

As shown in FIG. 3, the glass material unit U1 is prepared. A glass rod 2 serving as a core (hereinafter referred to as a main core rod) is inserted into each of the plurality of through-holes 14 of the main cladding body 1. Accordingly, the glass material unit U1 having a configuration in which the main core rod 2 is inserted into each of the plurality of through-holes 14 of the main cladding body 1 is obtained.

The main core rod 2 is preferably cleaned in advance using a cleaning solution such as water, alcohol, or alkaline solution. The main core rod 2 may be etched to remove dirt on a surface.

The preparation step is preferably performed in a room with a high degree of cleanliness. Accordingly, it is possible to prevent dust, dirt, or the like, which causes transmission loss, from adhering to the main core rod 2.

A core identification marker glass rod (not shown) may be inserted into one or more of the plurality of through-holes 14 of the main cladding body 1 instead of the main core rod 2. The core identification marker glass rod is, for example, a glass rod or the like having a different refractive index for both the main cladding body 1 and the main core rod 2.

The outer diameter of the main core rod 2 is, for example, 80 to 99% of the inner diameter of the through-hole 14. From the viewpoint of ensuring stable core position accuracy in an optical fiber, the outer diameter of the main core rod 2 is more preferably 90 to 99% of the inner diameter of the through-hole 14, and even more preferably 95 to 99% thereof.

(4) Dummy Tube Connection Step

Figure 4:
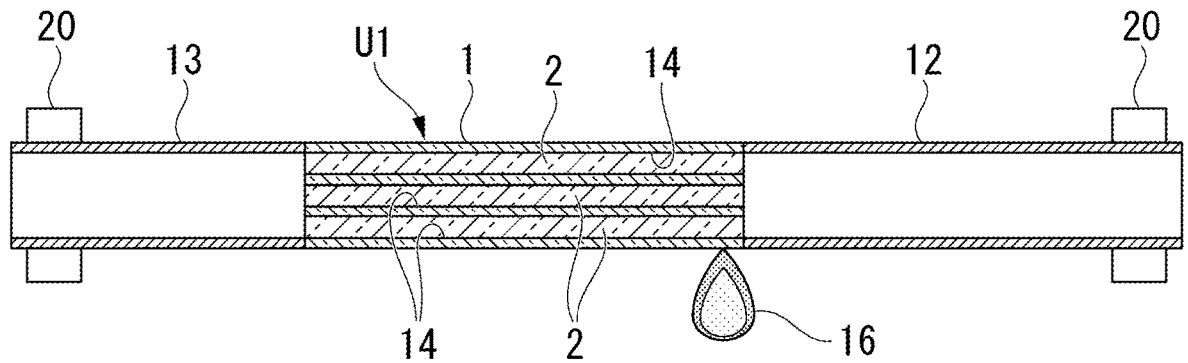
FIG. 4 is a process diagram subsequent to FIG. 3.

As shown in FIG. 4, each of dummy tubes 12 and 13 are connected to each of both ends of the glass material unit U1 by welding or the like. The dummy tubes 12 and 13 are, for example, cylindrical tubular bodies made of silica glass. In order to weld the dummy tubes 12 and 13 to the main cladding body 1, an end portion of the glass material unit U1 is heated by a flame 16 (for example, an oxyhydrogen flame) or the like.

The first dummy tube 12 is connected to the glass material unit U1 by butting an end surface thereof in the axial direction against one end surface of the glass material unit U1 in the axial direction. The second dummy tube 13 is connected to the glass material unit U1 by butting an end surface thereof against the other end surface of the glass material unit U1. The dummy tubes 12 and 13 can be gripped by a chuck 20.

In addition, in one or more embodiments, the dummy tube connection step is performed after the preparation step. However, the dummy tube connection step may be performed before the preparation step.

(5) Sealing Step

Figure 5:
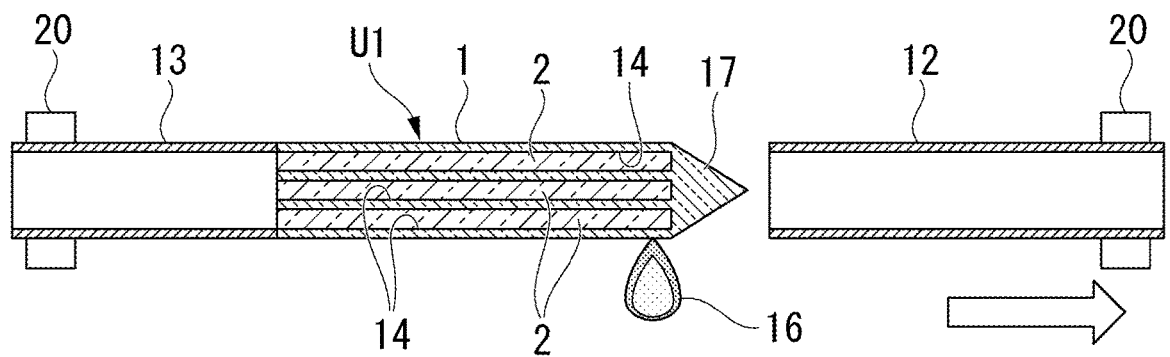
FIG. 5 is a process diagram subsequent to FIG. 4.

As shown in FIG. 5, an opening of the through-hole 14 is blocked (that is, sealed) by heating one end portion (hereinafter referred to as a first end portion; a right end portion in FIG. 5) of the glass material unit U1, using the flame 16 (for example, an oxyhydrogen flame) or the like, to reduce the diameter thereof. Accordingly, the first dummy tube 12 on the first end portion side of the glass material unit U1 is separated from the glass material unit U1 by fusing. By using the dummy tube 12, the fusing can be easily performed.

In addition, a means for heating the glass material unit U1 is not limited to the flame 16, and an electric furnace or the like may be used.

The first end portion of the glass material unit U1 in a state in which the opening of the through-hole 14 is sealed is referred to as a first end sealing portion 17. The first end sealing portion 17 is made solid by reducing the diameter of the first end portion of the main cladding body 1 together with the first end portion of the main core rod 2. The first end sealing portion 17 is formed, for example, in a tapered shape (for example, conical shape).

A decompression pump may be connected to the dummy tube 13 to decompress the inside of the through-hole 14. Accordingly, voids (bubbles) in the glass material unit U1 can be reduced.

(6) Glass Rod Connection Step

Figure 6:
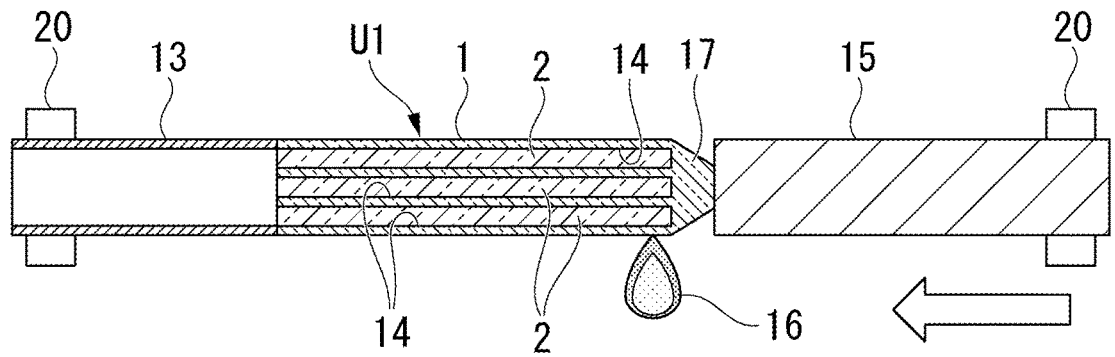
FIG. 6 is a process diagram subsequent to FIG. 5.

As shown in FIG. 6, an end portion of the glass rod 15 is welded to and integrated with the first end sealing portion 17 of the glass material unit U1. The glass rod 15 is made of, for example, silica glass. The glass rod 15 has a solid structure. The glass rod 15 is formed in a columnar shape. The outer diameter of the glass rod 15 is preferably the same as the outer diameter of the main cladding body 1.

The glass rod 15 is butted against an end surface of the first end portion (one end portion) of the glass material unit U1, aligned coaxially with the glass material unit U1, and welded to and integrated with the glass material unit U1. The glass rod 15 is connected to the first end portion of the glass material unit U1. The glass rod 15 blocks the openings of all the through-holes 14. Accordingly, the glass rod 15 is continuously installed at the first end portion of the glass material unit U1 (refer to FIG. 7). Each through-hole 14 becomes the main inner hole 4 (refer to FIG. 7).

Figure 7:
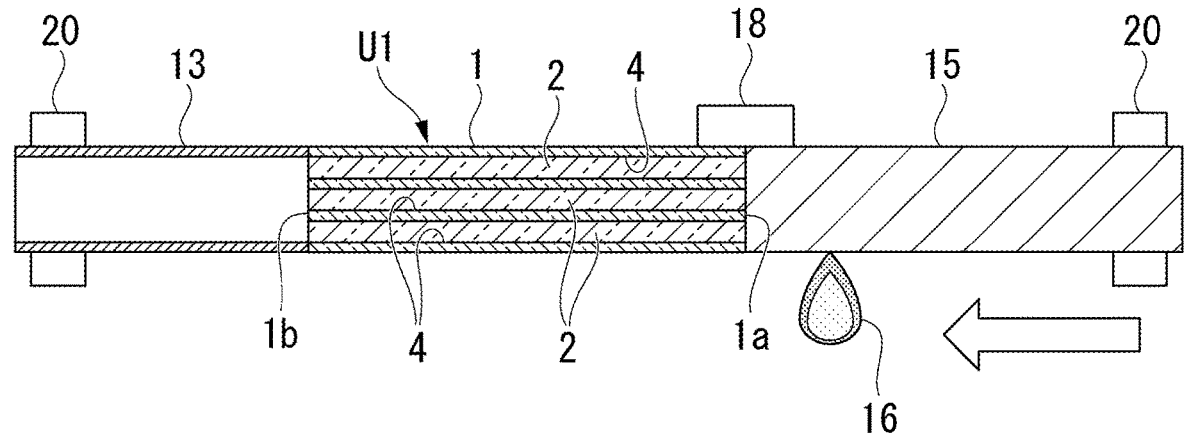
FIG. 7 is a process diagram subsequent to FIG. 6.

As shown in FIG. 7, as necessary, a soldering iron 18 can be applied to an outer peripheral surface of a connection spot between the glass rod 15 and the glass material unit U1 to reduce a step between the glass rod 15 and the glass material unit U1. Accordingly, it is possible to make it difficult for the optical fiber or a glass wire to break during drawing.

(7) Glass Rod Cutting Step

Figure 8:
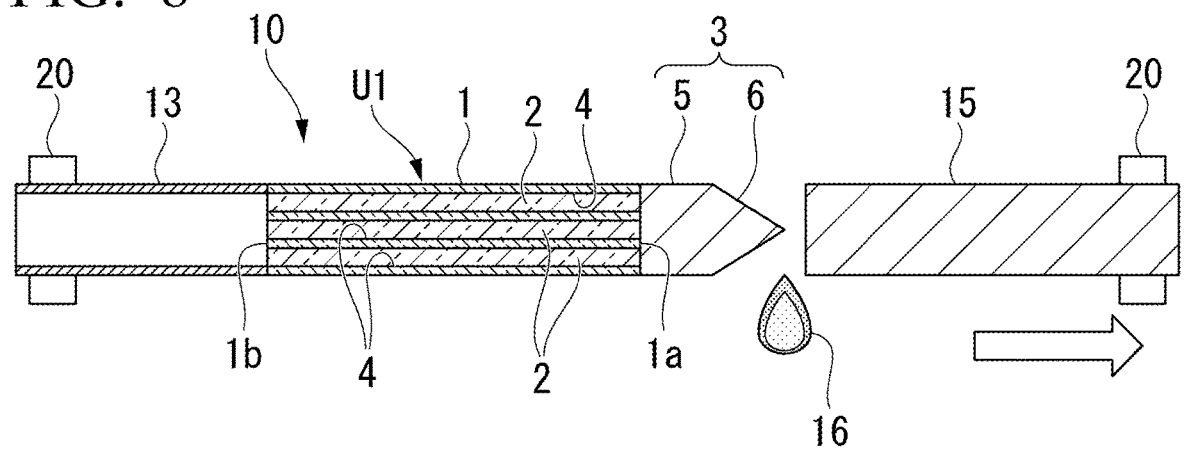
FIG. 8 is a process diagram subsequent to FIG. 7.

As shown in FIG. 8, an intermediate position of the glass rod 15 in a length direction is heated using the flame 16 (for example, an oxyhydrogen flame) or the like, and the glass rod 15 is cut by fusing.

A part of the glass rod 15 in the length direction remains as the tip continuously-installed portion 3 continuously installed at the glass material unit U1. Accordingly, the optical fiber preform 10 shown in FIG. 1 is obtained. The remaining portion of the glass rod 15 in the length direction is separated from the tip continuously-installed portion 3.

In the present process, the glass material unit U1 may seal a second end portion (for example, a left end portion of the optical fiber preform 10 in FIG. 8) in a state in which the inside is decompressed by the decompression pump. Accordingly, an optical fiber with few voids (bubbles) can be produced. In addition, in a case where the second end portion of the glass material unit U1 is not sealed, the optical fiber preform 10 may be heated by the heating unit 101 and melt-spun in a asymmetry confirmation process and a main producing process to be described below in a state in which the inside of the glass material unit U1 is decompressed by the decompression pump.

Figure 9:
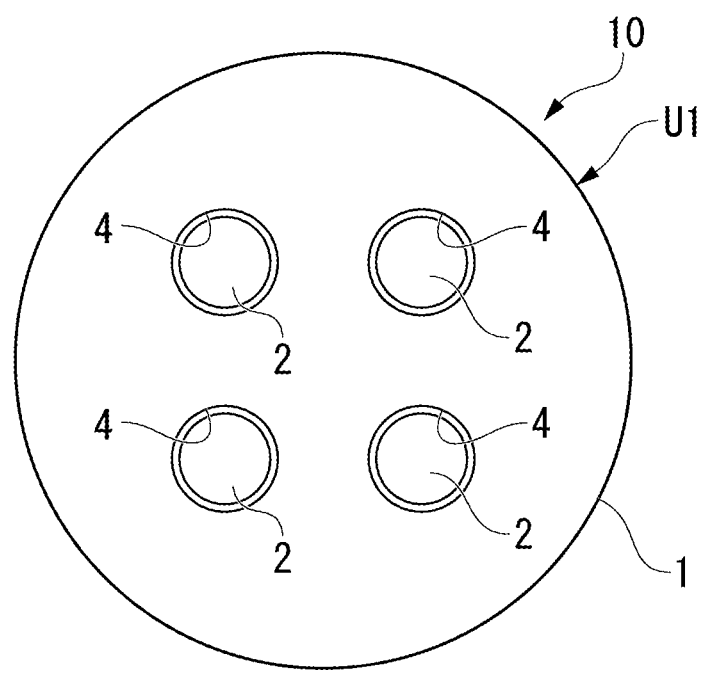
FIG. 9 is a sectional view orthogonal to the axial direction of the multi-core optical fiber preform.

FIG. 9 is a sectional view showing an example of the optical fiber preform 10. FIG. 9 shows a section perpendicular to the axial direction of the optical fiber preform 10. The number of main inner holes 4 in the optical fiber preform 10 in this example is four, and the four main inner holes 4 are arranged at equal intervals around the center axis of the main cladding body 1.

[Multi-Core Optical Fiber Production Method]

A multi-core optical fiber production method using the optical fiber preform 10 will be described with reference to FIG. 10.

Figure 10:
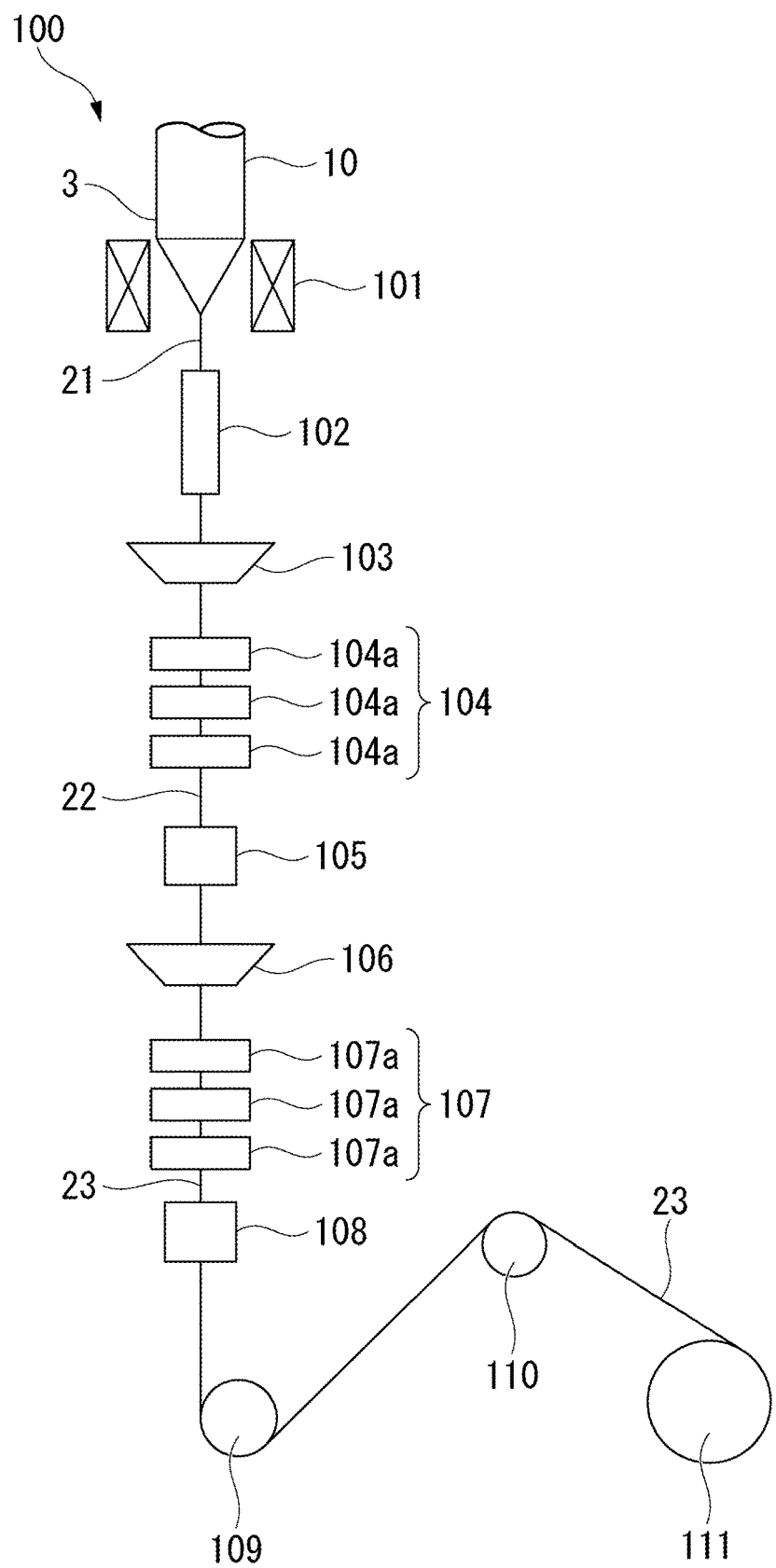
FIG. 10 is a configuration diagram showing an example of a multi-core optical fiber producing apparatus of one or more embodiments.
Figure 11:
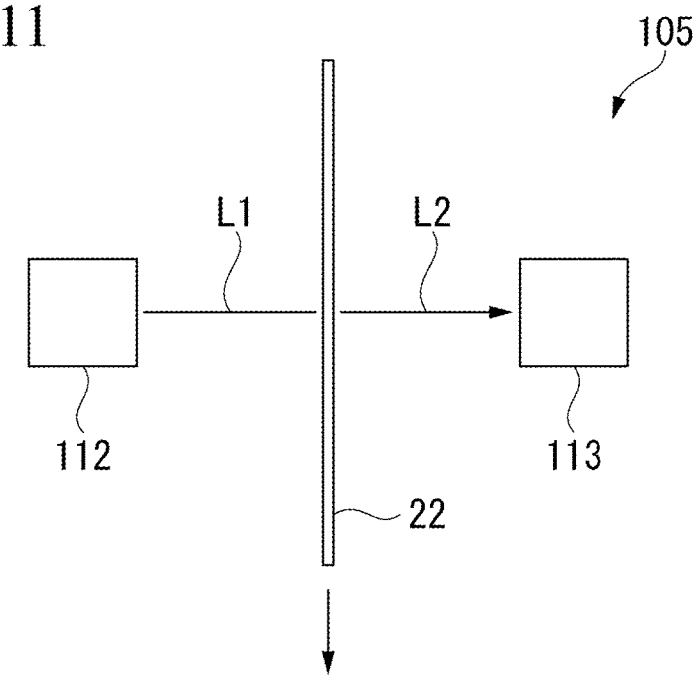
FIG. 11 is a schematic diagram showing the configuration of a first asymmetry detection unit of one or more embodiments.

FIG. 10 is a configuration diagram showing a multi-core optical fiber producing apparatus 100 (hereinafter simply referred to as a producing apparatus 100). FIG. 11 is a schematic diagram showing the configuration of a first asymmetry detection unit 105.

As shown in FIG. 10, the producing apparatus 100 includes a heating unit 101, a cooling unit 102, a first coating unit 103, a first curing unit 104, the first asymmetry detection unit 105, a second coating unit 106, a second curing unit 107, a second asymmetry detection unit 108, a pulley 109, a take-off unit 110, and a winding unit 111.

The first curing unit 104 includes one or a plurality of UV lamps 104a. The second curing unit 107 includes one or a plurality of UV lamps 107a.

The multi-core optical fiber production method according to one or more embodiments has (1) asymmetry confirmation process and (2) main producing process.

(1) Asymmetry Confirmation Process

The optical fiber preform 10 is heated by the heating unit 101 and melt-spun. That is, the viscosity of the glass is lowered (softened) by heating a tip part of the optical fiber preform 10 (a tip part of the tip continuously-installed portion 3), and the softened glass is drawn. Since the tip continuously-installed portion 3 is a solid glass rod (refer to FIG. 1), the drawn glass is a glass wire 21 without a core. The glass wire 21 is cooled by the cooling unit 102.

The first coating unit 103 applies (coats) a coating material such as a urethane acrylate-based resin to an outer periphery of the glass wire 21 to form a first coating layer. The glass wire 21 on which the first coating layer is formed is referred to as an intermediate body 22 (coated wire).

The intermediate body 22 is irradiated with UV by the UV lamps 104a of the first curing unit 104 to cure the first coating layer.

As shown in FIG. 11, the first asymmetry detection unit 105 includes a light emitting part 112 and a light receiving part 113. The light emitting part 112 irradiates the intermediate body 22 with laser light L1 (test light). The light receiving part 113 receives forward scattered light L2. The deviation of thickness (asymmetry) of the first coating layer can be confirmed on the basis of the forward scattered light L2 in the first asymmetry detection unit 105.

As shown in FIG. 10, since the intermediate body 22 has no cores, scattering of the laser light caused by a plurality of cores does not occur. For that reason, it is possible to easily confirm the asymmetry of the first coating layer on the basis of the position of the brightness and darkness of the forward scattered light. In a case where the asymmetry of the first coating layer is confirmed, the asymmetry can be suppressed by adjusting the conditions of the coating layer in the first coating unit 103.

The second coating unit 106 applies (coats) a coating material such as a urethane acrylate-based resin to an outer periphery of the intermediate body 22 to form a second coating layer. The intermediate body 22 on which the second coating layer is formed is referred to as a coated glass wire 23 (coated wire).

The coated glass wire 23 is irradiated with UV by the UV lamps 107a of the second curing unit 107 to cure the second coating layer.

The second asymmetry detection unit 108 includes a light emitting part (not shown) and a light receiving part (not shown). The second asymmetry detection unit 108 can have the same configuration as the first asymmetry detection unit 105 (refer to FIG. 11). The light emitting part irradiates the coated glass wire 23 with laser light (test light). The light receiving part receives the forward scattered light. The second asymmetry detection unit 108 can confirm the asymmetry of the second coating layer on the basis of the forward scattered light.

Since the coated glass wire 23 has no core, scattering of the laser light caused by a plurality of cores does not occur.

For that reason, it is possible to easily confirm the asymmetry of the second coating layer on the basis of the position of the brightness and darkness of the forward scattered light. In a case where the asymmetry of the second coating layer is confirmed, the asymmetry can be suppressed by adjusting the conditions of the coating layer in the second coating unit 106.

The pulley 109 converts the direction of the coated glass wire 23. The take-off unit 110 is, for example, a take-off capstan and determines drawing speed. The winding unit 111 winds the coated glass wire 23.

(2) Main Producing Process

When the tip continuously-installed portion 3 is consumed by the drawing, a drawing end shifts to the glass material unit U1 (refer to FIG. 1). A bare optical fiber drawn from the glass material unit U1 has the first coating layer formed by the first coating unit 103, and the first coating layer is cured by the first curing unit 104 to form an optical fiber element wire intermediate body.

The optical fiber element wire intermediate body has the second coating layer formed by the second coating unit 106, and the second coating layer is cured by the second curing unit 107 to form an optical fiber element wire.

As shown in FIG. 1, the main cladding body 1 of the glass material unit U1 serves as a cladding of the optical fiber element wire. The main core rod 2 serves as a core of the optical fiber element wire. Since a plurality of the main core rods 2 is provided, the optical fiber element wire is a multi-core optical fiber.

[Effects of Optical Fiber Preform and Multi-Core Optical Fiber Production Method According to One or More Embodiments]

The optical fiber preform 10 of one or more embodiments includes the tip continuously-installed portion 3 provided with no core rod or provided with one core rod. The tip continuously-installed portion 3 has a smaller number of cores than the glass material unit U1. The tip continuously-installed portion 3 allows the intermediate body 22 and the coated glass wire 23 having one or less cores to be made. For that reason, in the asymmetry detection units 105 and 108, it is possible to confirm the asymmetry of a coating layer under the conditions of little light scattering. Hence, it is possible to accurately confirm the asymmetry of the coating layer.

In the optical fiber preform 10, since the tip continuously-installed portion 3 is a solid glass rod, the intermediate body 22 and the coated glass wire 23 with no core can be made in the asymmetry confirmation process. For that reason, in the asymmetry detection units 105 and 108, it is possible to confirm the asymmetry of a coating layer under the conditions of less light scattering.

According to the production method, in order to draw the optical fiber preform 10 including the tip continuously-installed portion 3, the intermediate body 22 and the coated glass wire 23 having one or less cores can be made prior to the main producing process of producing the multi-core optical fiber. For that reason, in the asymmetry detection units 105 and 108, it is possible to confirm the asymmetry of a coating layer under the conditions of little light scattering. Hence, it is possible to accurately confirm the asymmetry of the coating layer.

In the above production method described, since the tip continuously-installed portion 3 is a solid glass rod, the intermediate body 22 and the coated glass wire 23 with no core can be made in the asymmetry confirmation process. For that reason, in the asymmetry detection units 105 and 108, it is possible to confirm the asymmetry of a coating layer under the conditions of less light scattering.

The tip continuously-installed portion 3 includes the constant diameter portion 5 having a constant outer diameter and the reduced diameter portion 6 that is reduced in diameter from a tip 5a of the constant diameter portion 5 and protrudes from the tip 5a. When the length A1 of the constant diameter portion 5 is equal to or larger than the length A2 of the reduced diameter portion 6, the intermediate body 22 and the coated glass wire 23 are given sufficient lengths for confirming asymmetry. For that reason, it is possible to confirm the asymmetry of a coating layer with higher accuracy.

The length A1 of the constant diameter portion 5 may be less than the length A2 of the reduced diameter portion 6. In this case, the time required for the process of irradiating a coated wire with laser light to confirm the asymmetry (asymmetry confirmation process) can be shortened, and a shift to the main producing process can be made at an early stage. Therefore, the producing efficiency of a multi-core optical fiber can be enhanced.

Second Example

[Multi-Core Optical Fiber Preform]

Figure 12:
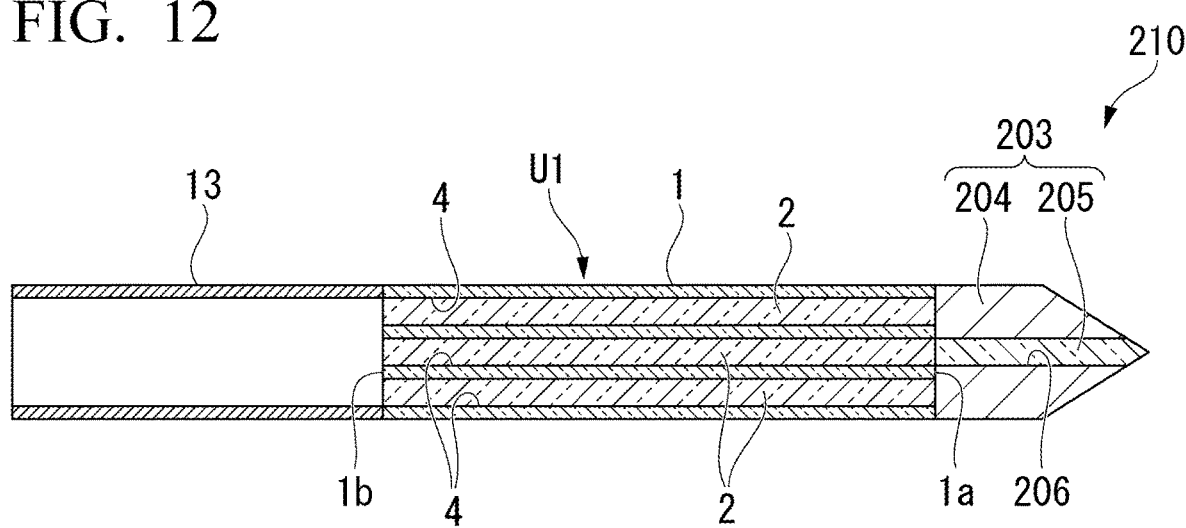
FIG. 12 is a sectional view in the axial direction of a multi-core optical fiber preform of one or more embodiments.

FIG. 12 is a sectional view in the axial direction of an optical fiber preform 210 of a second example. Components common to those of the optical fiber preform 10 (refer to FIG. 1) of the first example will be designated by the same reference numerals, and a description thereof will be omitted.

The optical fiber preform 210 includes the main cladding body 1, the plurality of main core rods 2, a tip continuously-installed portion 203, and the dummy tube 13. The optical fiber preform 210 is different from the optical fiber preform 10 shown in FIG. 1 in that the tip continuously-installed portion 203 is used instead of the tip continuously-installed portion 3.

The tip continuously-installed portion 203 is a single core unit including a tip cladding body 204 and one tip core rod 205.

The outer shape of the tip cladding body 204 is the same as the outer shape of the tip continuously-installed portion 3 shown in FIG. 1. The tip cladding body 204 is made of glass (for example, silica glass). One tip inner hole 206 is formed in the tip cladding body 204. The tip inner hole 206 is formed in the axial direction of the tip cladding body 204 at a central portion of the tip cladding body 204.

The tip core rod 205 is formed in a columnar shape (rod shape). The tip core rod 205 is made of glass (for example, silica glass). Tip core rod 205 includes a region of a higher refractive index than tip cladding body 204. The tip core rod 205 is inserted into the tip inner hole 206.

The tip continuously-installed portion 203 is continuously installed at the first end 1a (one end) of the main cladding body 1 by welding. The tip continuously-installed portion 203 is coaxial with the main cladding body 1. The tip continuously-installed portion 203 blocks all the main inner holes 4 of the main cladding body 1. The outer diameter of the tip continuously-installed portion 203 is preferably the same as the outer diameter of the main cladding body 1. Since the tip continuously-installed portion 203 includes one core rod (tip core rod 205), the number of core rods owned is one.

By drawing the optical fiber preform 210, a multi-core optical fiber can be produced in the same manner as the optical fiber preform 10 of the first example (refer to FIG. 10).

Since the optical fiber preform 210 includes the tip continuously-installed portion 203 of which the number of core rods owned is one, it is possible to make an intermediate body and a coated glass wire having one or less cores in the asymmetry confirmation process. For that reason, in the asymmetry detection units, it is possible to confirm the asymmetry of a coating layer under the conditions of little light scattering. Hence, it is possible to accurately confirm the asymmetry of the coating layer.

Third Example

[Multi-Core Optical Fiber Preform]

Figure 13:
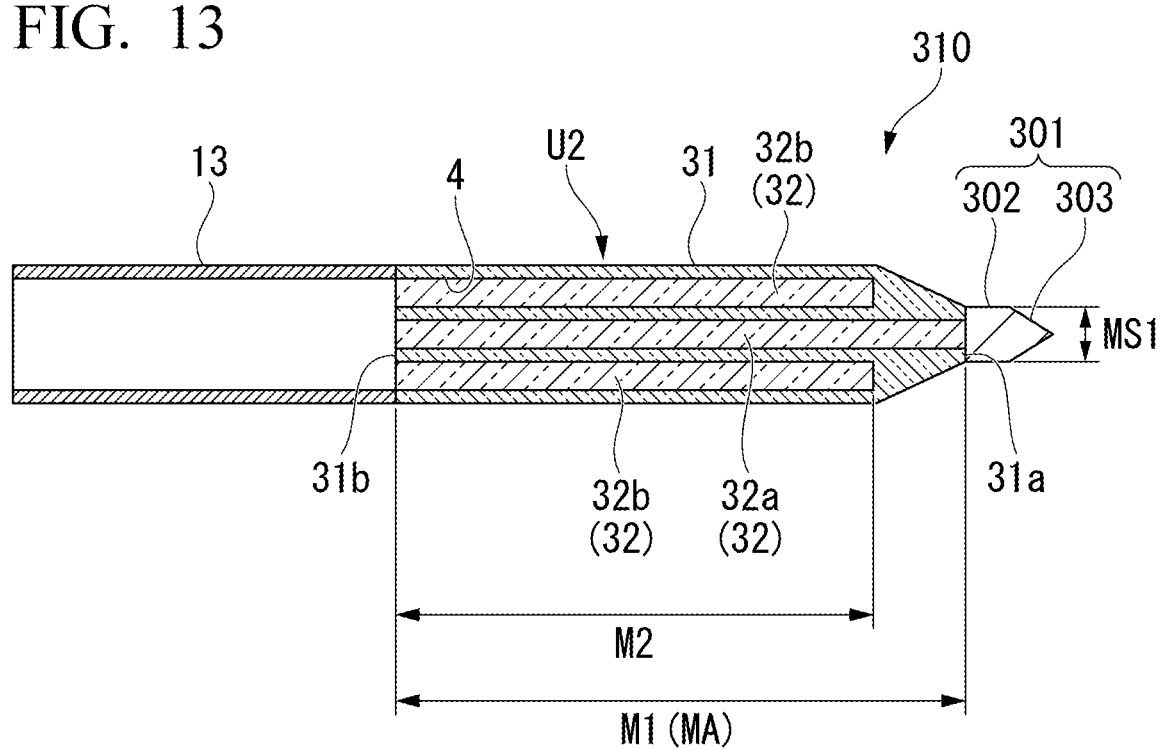
FIG. 13 is a sectional view in the axial direction of a multi-core optical fiber preform of one or more embodiments.

FIG. 13 is a sectional view in the axial direction of an optical fiber preform 310 of a third example. Components common to those of the optical fiber preform 10 (refer to FIG. 1) of the first example will be designated by the same reference numerals, and a description thereof will be omitted.

The optical fiber preform 310 includes a main cladding body 31, a plurality of main core rods 32, a tip continuously-installed portion 301, and the dummy tube 13. The optical fiber preform 310 is different from the optical fiber preform 10 shown in FIG. 1 in the configuration of the glass material unit U2 and the position where the tip continuously-installed portion 301 is provided.

The plurality of main core rods 32 includes a first core rod 32a and a second core rod 32b.

A dimension M1 of the first core rod 32a in the axial direction is the same as a dimension MA of the main cladding body 31 in the axial direction. A dimension M2 of the second core rod 32b in the axial direction is shorter than the dimension MA of the main cladding body 31 in the axial direction. Additionally, the dimension M2 of the second core rod 32b is shorter than the dimension M1 of the first core rod 32a in the axial direction.

The first core rod 32a is disposed at the center of the main cladding body 31. For example, the main core rod 2 shown in FIG. 9 is equivalent to the second core rod 32b of one or more embodiments, and the first core rod 32a is configured to be surrounded by four second core rods 32b.

The tip continuously-installed portion 301 includes a constant diameter portion 302 and a reduced diameter portion 303. The length relationship between the constant diameter portion 302 and the reduced diameter portion 303 is the same as that of the first example.

The tip continuously-installed portion 301 does not have a core rod.

The tip continuously-installed portion 301 is continuously installed at the first end 31a (end surface) of the main cladding body 31 by welding. The tip continuously-installed portion 301 is coaxial with the main cladding body 31. The tip continuously-installed portion 301 blocks the main inner hole 4 of the first core rod 32a. The outer diameter of the tip continuously-installed portion 301 is slightly larger than the outer diameter of the first core rod 32a.

Additionally, a tip part of the main cladding body 31 has a tapered shape that is reduced in diameter toward the first end 31a.

In addition, in one or more embodiments, the dimension M1 of the first core rod 32a in the axial direction is the same as the dimension MA of the main cladding body 31 in the axial direction. The dimension M1 of the first core rod 32a may be shorter than the dimension MA of the main cladding body 31.

According to the multi-core optical fiber preform 310 according to one or more embodiments, compared to the multi-core optical fiber preform 10 of FIG. 1 and the multi-core optical fiber preform 210 of FIG. 12, the outer diameter of the tip continuously-installed portion 301 is small. Therefore, the thermal capacity of the tip continuously-installed portion 301 is reduced. As a result, the tip continuously-installed portion 301 is easily melted. For this reason, when the multi-core optical fiber preform 310 of FIG. 13 is installed in a drawing device and the tip continuously-installed portion 301 is heated, the time for the process of dropping the tip continuously-installed portion 301 of the multi-core optical fiber preform 310 (dropping process) can be shortened. Accordingly, especially in a case where the length of the first core rod 32a is long in the axial direction, it is possible to shorten the time from the dropping process to the main drawing process of paying out a product fiber from the multi-core optical fiber preform 310.

[Multi-Core Optical Fiber Preform Production Method]

A method of producing the optical fiber preform 310 will be described with reference to FIGS. 14 and 15. In addition, in the drawings used for the following description, there is a case where the scale is changed in order to make the members recognizable in size. A description of the same processes as those of the first example will be omitted.

In the drilling step, the through-holes 14 are formed at the center of the main cladding body 31 and at a plurality of spots at intervals in a direction around an axis so as to surround the center of the main cladding body 31.

The cleaning step is the same as that of the first example.

Figure 14:
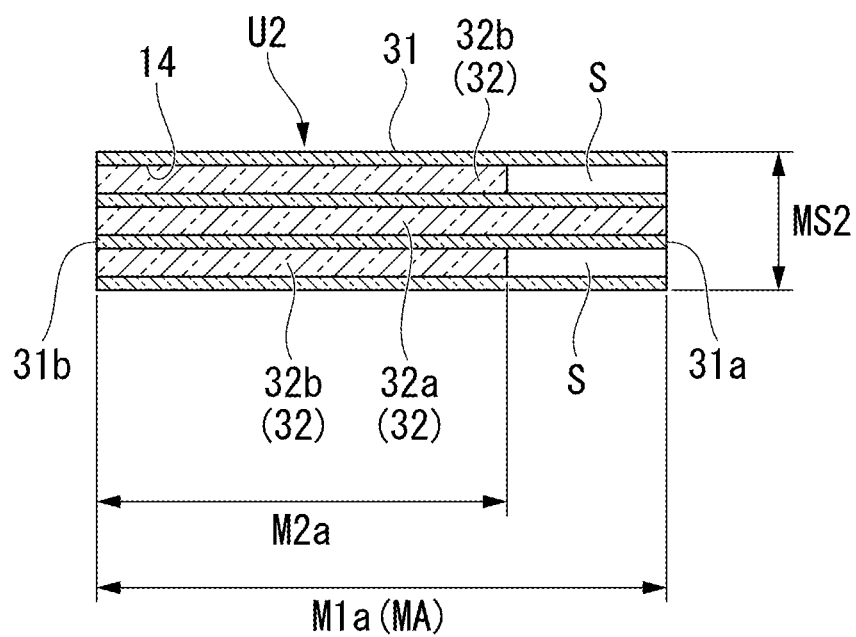
FIG. 14 is a process diagram illustrating a method of producing the multi-core optical fiber preform of FIG. 13.

In the preparation step, as shown in FIG. 14, the glass material unit U2 is prepared. Each of a glass rod 32a (hereinafter referred to as a first core rod) and a glass rod 32b (hereinafter referred to as a second core rod) serving as cores is inserted into each of the plurality of through-holes 14 of the main cladding body 31. Specifically, the first core rod 32a is inserted into the through-hole (main inner hole) 14 formed at the center of the main cladding body 31, and the second core rod 32b is inserted into the through-hole 14 formed so as to surround the center of the main cladding body 31.

A dimension M1a of the first core rod 32a in the axial direction is the same as the dimension MA of the main cladding body 31 in the axial direction. In addition, in one or more embodiments, the dimension M1a of the first core rod 32a in the axial direction is the same as the dimension MA of the main cladding body 31 in the axial direction. However, the dimension M1a of the first core rod 32a may be shorter than the dimension MA of the main cladding body 31.

A dimension M2a of the second core rod 32b in the axial direction is shorter than the dimension MA (the dimension of the through-hole 14) of the main cladding body 31 in the axial direction. Additionally, the dimension M2a of the second core rod 32b in the axial direction is shorter than the dimension M1a of the first core rod 32a in the axial direction. For this reason, a gap S is formed between an end surface of the main cladding body 31 and the second core rod 32b. Additionally, no gap is formed on the second end 31b side of the through-hole 14 through which the second core rod 32b is inserted.

In this way, the glass material unit U2 having a configuration in which each of the first core rods 32a and the second core rods 32*b* is inserted into each of the plurality of through-holes 14 of the main cladding body 31 is obtained.

After that, the dummy tube connection step is performed similarly to that of the first example.

Next, the following processing is performed in the sealing step while a vacuum state is maintained.

Figure 15:
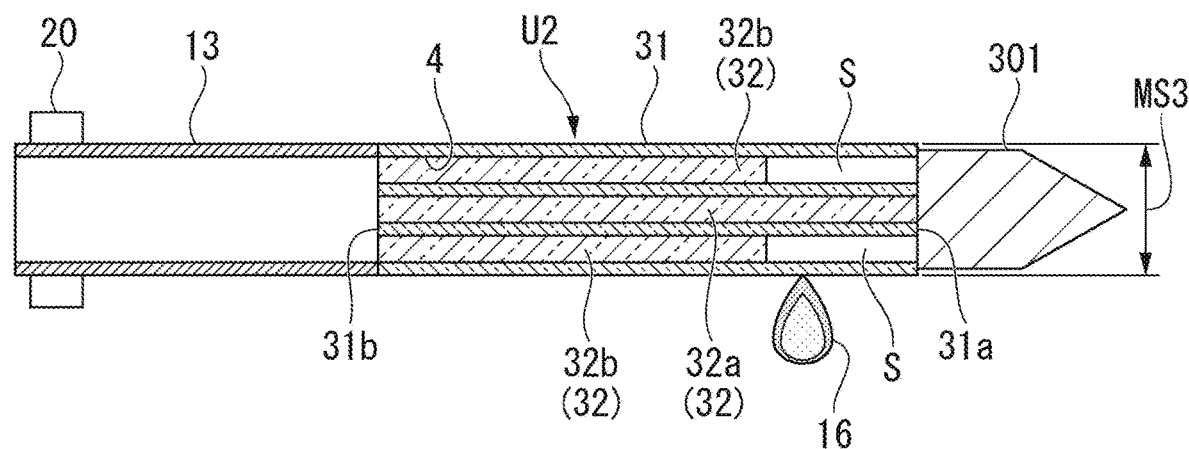
FIG. 15 is a process diagram illustrating a method of producing multi-core optical fiber preform of FIG. 13.

As shown in FIG. 15, the tip continuously-installed portion 301 has an outer diameter slightly smaller than the outer diameter of the main cladding body 31. With this configuration, it is possible to make the outer diameter of the main cladding body 31 substantially the same as the outer diameter of the tip continuously-installed portion 301 when the gap S is crushed in the sealing step to be described below.

Additionally, an outer diameter dimension MS3 on the tip continuously-installed portion 301 side of the main cladding body 31 of FIG. 15 may be equal to an outer diameter dimension MS1 on the tip continuously-installed portion 301 side of the main cladding body 31 in FIG. 13. In this case, the gap S is crushed in the state of FIG. 14, and the tip continuously-installed portion 301 is provided.

Additionally, an outer diameter dimension MS2 of the main cladding body 31 in FIG. 14 may be the largest, the outer diameter dimension MS3 of the main cladding body 31 in FIG. 15 may be the next largest, and the outer diameter dimension MS1 of the main cladding body 31 in FIG. 13 may be the smallest (MS2>MS3>MS1). In this case, as shown in FIG. 14, the dummy tube 12 is fused in a state in which the gap S of the through-hole 14 is provided. In this case, the gap S in the vicinity of the fused spot is slightly crushed. Thereafter, in the sealing step or the glass rod connecting step, the optical fiber preform 310 in FIG. 13 is formed by performing evacuation and crushing the gap S.

However, by setting the timing at which the evacuation is performed to be midway when the dummy tube 12 is fused from a state in which the gap S is provided, it is possible to create a structure in which the gap is completely crushed as shown in FIG. 13.

For example, in a case where the outer diameter of the main cladding body 31 is φ80 mm, the inner diameter of the through-hole 14 is φ20 mm, and the four gaps S are crushed, the outer diameter of the main cladding body 31 after the crushing is φ70 $(2\times\sqrt{((80/2)^2\times\pi-4\times(20/2)^2\times\pi)})$ mm. That is, as for the outer diameter of the main cladding body 31, assuming that the outer diameter of the main cladding body 31 is φ1 and the inner diameter of the through-hole 14 is φ2, the outer diameter of the main cladding body 31 after being crushed can be represented by $2\times\sqrt{((\varphi 1/2)^2-\Sigma i(\varphi 2/2)^2)}$ (Σ is i=1 to N).

That is, the outer diameter of the tip continuously-installed portion 301 is adjusted so as to match the outer diameter of the main cladding body 31 after the gap S is crushed.

In addition, in one or more embodiments, the tip continuously-installed portion 301 is welded to the tip of the main cladding body 31. In addition to this, after a thin rod (tip continuously-installed portion) is attached to the tip of the main cladding body 31, the tip continuously-installed portion may be formed by fusing the tip of the rod.

As shown in FIG. 15, the gap S is evacuated in the sealing step. Next, a region including the gap S of the main cladding body 31 is heated by the flame 16 or the like, and the diameter of the main cladding body 31 is reduced to block the gap S. Accordingly, the outer diameter of the main cladding body 31 and the outer diameter of the tip continuously-installed portion 301 become substantially the same when the gap S is crushed. In this way, the optical fiber preform 310 shown in FIG. 13 is formed.

By drawing the optical fiber preform 310, a multi-core optical fiber can be produced in the same manner as the optical fiber preform 10 of the first example (refer to FIG. 10).

Also, in the optical fiber preform 310 of the present example, the same effects as those of the first example can be obtained. Additionally, even in a case where the first core rod 32*a* is fused in the sealing step shown in FIG. 15 and the first core rod 32*a* protruding from the second core rod 32*b* becomes the tip continuously-installed portion, there is only one core at the tip part of the glass material unit U2. Therefore, it is easy to confirm the asymmetry.

Additionally, since the tip part of the glass material unit U2 has the same configuration as that of the single core fiber, it is possible to easily confirm the asymmetry in this region. Additionally, since the dimension M2 of the second core rod 32*b* is shorter than the dimension MA of the through-hole 14, the gap S is easily crushed by fusing the main cladding body 31 while vacuuming the inside of a hole thereof. That is, the outer diameter of the preform is smaller than that of a region where all the through-holes 14 are filled with rods. As a result, compared to the region where all the through-holes 14 are filled with rods, the time required for fusing is reduced, and the fusing is made easier.

Figure 16:
FIG. 16 is a photograph showing an example of forward scattered light when a single-core coated wire is irradiated with laser light.
Figure 17:
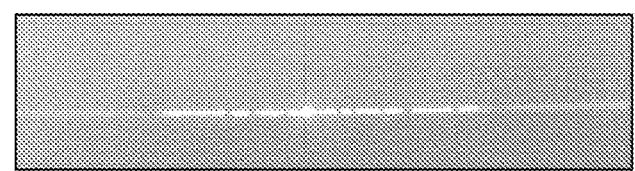
FIG. 17 is a photograph showing an example of the forward scattered light when a multi-core coated wire is irradiated with laser light.

FIG. 16 is a photograph showing an example of forward scattered light when a single-core coated wire is irradiated with laser light. FIG. 17 is a photograph showing an example of the forward scattered light when a multi-core coated wire is irradiated with laser light.

The intermediate body and the coated glass wire obtained by drawing the tip continuously-installed portion 203 shown in FIG. 15 are single-core coated wires. For that reason, as shown in FIG. 16, the forward scattered light exhibits a pattern in which bright spots and dark spots are distinct. For that reason, it is easy to confirm the asymmetry of the coating layer.

In contrast, as shown in FIG. 17, in a case where the coated wire is multi-core, the forward scattered light has a plurality of bright spots caused by a plurality of cores. Therefore, it is not easy to confirm the asymmetry of the coating layer.

As shown in FIG. 15, the tip continuously-installed portion 203 is the single core unit including the tip cladding body 204 and the one top core rod 205. For that reason, the tip continuously-installed portion 203 can be made using a waste material of an optical fiber preform for a single-core optical fiber.

Accordingly, the optical fiber preform 210 is easily made. Additionally, the optical fiber preform 210 can be made at low cost.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

A stack-and-draw method may be applied to the optical fiber preform of one or more embodiments. In a case where the stack-and-draw method is applied, for example, a plurality of main core rods and a plurality of spacer rods are inserted into one through-hole (main inner hole) of a glass tube (main cladding body). Accordingly, a glass material unit including the glass tube, the main core rods, and the spacer rods is obtained. An optical fiber preform is constituted by the glass material unit and a tip continuously-installed portion.

A rod-in-tube method may be applied to the optical fiber preform of one or more embodiments. In that case, the number of through-holes (main inner holes) in a main cladding body is preferably plural, but is not limited to plural. That is, the glass material unit may be constituted by a main cladding body having one through-hole and a plurality of main core rods inserted into the through-hole.

REFERENCE SIGNS LIST

1: Main cladding body
2: Main core rod
3, 203: Tip continuously-installed portion
4: Main inner hole
210: Multi-core optical fiber preform
22: Intermediate body (coated wire)
23: Coated glass wire (coated wire)
204: Tip cladding body
205: Tip core rod
206: Tip inner hole
A1: Length of constant diameter portion
A2: Length of reduced diameter portion
L1: Laser light (test light)
L2: Forward scattered light

What is claimed is:

1. A multi-core optical fiber preform comprising:
a rod-shaped main cladding body having one or more main inner holes;
main core rods inserted into the one or more main inner holes; and
a tip continuously-installed portion disposed at one end of the rod-shaped main cladding body and including a glass rod having a single core rod.

2. The multi-core optical fiber preform according to claim 1, wherein
the main core rods include a first core rod and a second core rod that has a dimension in an axial direction of the rod-shaped main cladding body shorter than a dimension of the rod-shaped main cladding body in the axial direction, and
the first core rod is disposed at a center of the rod-shaped main cladding body.

3. The multi-core optical fiber preform according to claim 1, wherein
the tip continuously-installed portion includes a constant diameter portion having a constant outer diameter and a reduced diameter portion that is reduced in diameter from a tip of the constant diameter portion and protrudes from the tip, and
a length of the constant diameter portion in the axial direction is equal to or larger than a length of the reduced diameter portion in the axial direction.

4. The multi-core optical fiber preform according to claim 1, wherein the tip continuously-installed portion includes a constant diameter portion having a constant outer diameter and a reduced diameter portion that is reduced in diameter from a tip of the constant diameter portion and protrudes from the tip, and
a length of the constant diameter portion in the axial direction is less than a length of the reduced diameter portion in the axial direction.

5. A multi-core optical fiber preform comprising:
a rod-shaped main cladding body having one or more main inner holes;
main core rods inserted into the one or more main inner holes; and
a tip continuously-installed portion that:
is disposed at one end of the rod-shaped main cladding body, and includes:
a solid constant diameter portion having a constant outer diameter; and
a solid reduced diameter portion that is reduced in diameter from a tip of the solid constant diameter portion and protrudes from the tip, wherein
the solid constant diameter portion and the solid reduced diameter portion include a glass rod having no core rod or having a single core rod.

6. The multi-core optical fiber preform according to claim 5, wherein
the main core rods include a first core rod and a second core rod that has a dimension in an axial direction of the rod-shaped main cladding body shorter than a dimension of the rod-shaped main cladding body in the axial direction, and
the first core rod is disposed at a center of the rod-shaped main cladding body.

7. The multi-core optical fiber preform according to claim 5, wherein the tip continuously-installed portion includes a solid glass rod.

8. The multi-core optical fiber preform according to claim 5, wherein a length of the solid constant diameter portion in the axial direction is equal to or larger than a length of the solid reduced diameter portion in the axial direction.

9. The multi-core optical fiber preform according to claim 5, wherein a length of the solid constant diameter portion in the axial direction is less than a length of the solid reduced diameter portion in the axial direction.

* * * * *